United States Patent
Dennison

(10) Patent No.: US 10,224,847 B2
(45) Date of Patent: Mar. 5, 2019

(54) METHOD OF EFFICIENTLY OPERATING AN ENGINE AND A GENERATOR FOR INCREASED LOAD

(71) Applicant: ROLLS-ROYCE plc, London (GB)

(72) Inventor: Stephen Dennison, Derby (GB)

(73) Assignee: ROLLS-ROYCE plc, Derby (GB)

( * ) Notice: Subject to any disclaimer, the term of this patent is extended or adjusted under 35 U.S.C. 154(b) by 0 days.

(21) Appl. No.: 15/667,710

(22) Filed: Aug. 3, 2017

(65) Prior Publication Data

US 2018/0041152 A1 Feb. 8, 2018

(30) Foreign Application Priority Data

Aug. 8, 2016 (GB) .................................. 1613585.7

(51) Int. Cl.
*H02P 9/04* (2006.01)
*F02C 9/20* (2006.01)
(Continued)

(52) U.S. Cl.
CPC ............. *H02P 9/04* (2013.01); *F01D 15/10* (2013.01); *F02C 9/18* (2013.01); *F02C 9/20* (2013.01); *F02C 9/52* (2013.01); *F02C 9/54* (2013.01); *F04D 27/0223* (2013.01); *F04D 27/0246* (2013.01); *H02P 9/40* (2013.01); *H02P 25/092* (2016.02); *F05D 2220/76* (2013.01); *F05D 2270/06* (2013.01); *F05D 2270/101* (2013.01);
(Continued)

(58) Field of Classification Search
CPC ................. F02C 9/52; F02C 9/54; H02P 9/04
See application file for complete search history.

(56) References Cited

U.S. PATENT DOCUMENTS 7,471,996 B2 * 12/2008 Bartel ........................ F02C 9/00
                                                       244/53 B
8,209,101 B2    6/2012 Breit
                (Continued)

FOREIGN PATENT DOCUMENTS

EP         2727839 A2    5/2014

*Primary Examiner* — Abdullah A Riyami
*Assistant Examiner* — S. Mikailoff
(74) *Attorney, Agent, or Firm* — Oliff PLC

(57) ABSTRACT

Method of operating an engine and electricity generator powered by torque from the engine is provided. The engine has a working-line which is a locus of engine operating points as the engine is throttled. The method includes increasing electrical-load on the generator. Repeatedly performing steps of: (i) detecting the engine working-line position; (ii) determining if the detected working-line position is sufficient for the engine to provide additional torque to power the generator while maintaining engine operation within range of acceptable engine operating conditions relative to the detected working-line position; (iii) when determination at step (ii) is that the engine operating condition is insufficient, modifying engine operational parameters to adjust the working-line position for the engine to provide additional torque while maintaining engine operation within the range of acceptable engine operating conditions; and (iv) increasing electrical-output from the generator by an amount so the engine provides additional torque. Repeating steps until the generator electrical-output matches electrical-load.

11 Claims, 6 Drawing Sheets

(51) Int. Cl.
*F02C 9/52* (2006.01)
*F02C 9/54* (2006.01)
*F01D 15/10* (2006.01)
*F04D 27/02* (2006.01)
*F02C 9/18* (2006.01)
*H02P 9/40* (2006.01)
*H02P 25/092* (2016.01)
*H02P 101/30* (2015.01)

(52) U.S. Cl.
CPC .... *F05D 2270/335* (2013.01); *H02P 2101/30* (2015.01)

(56) References Cited

U.S. PATENT DOCUMENTS

| | | | |
|---|---|---|---|
| 8,432,059 B2 | 4/2013 | Waite et al. | |
| 8,738,268 B2 | 5/2014 | Karimi et al. | |
| 9,260,976 B2* | 2/2016 | Phillips | F02C 7/32 |
| 9,593,591 B2* | 3/2017 | Phillips | F02C 7/32 |
| 2011/0016876 A1* | 1/2011 | Cataldi | F02C 9/20 |
| | | | 60/773 |
| 2014/0271114 A1 | 9/2014 | Phillips et al. | |
| 2015/0275768 A1 | 10/2015 | Anghel et al. | |
| 2016/0153365 A1* | 6/2016 | Fletcher | F02C 9/50 |
| | | | 60/773 |
| 2018/0041152 A1* | 2/2018 | Dennison | H02P 9/04 |

* cited by examiner

METHOD OF EFFICIENTLY OPERATING AN ENGINE AND A GENERATOR FOR INCREASED LOAD

FIELD OF THE INVENTION

The present invention relates to managing electrical loads applied to an electrical generator powered by an engine.

BACKGROUND

Small gas-turbine engines, which are typically run with small surge margins (i.e. relatively close to unsafe operating condition, in which the airflow through the compressors may be disrupted), can be disturbed by increasing the electrical load applied to a generator powered by said engines. This problem is compounded by the development of increasingly electrified aircraft. For example electrical fuel pumps, cabin environmental controls etc. can all place a large electrical load on the generator.

Conventionally, to counter the above, a large surge margin is applied to engine design which accommodates engine power off-takes and engine degradation. However, as more and more aircraft functions become electric (such as environmental cabin systems and de-icing mats) the potential for a large transient electrical load increases. Conversely, there is a desire to run the engine with a smaller surge margin as this improves the efficiency of the engine. Therefore there is a problem in that the engine either needs to be oversized (leading to inefficiency and increased weight) to effectively power-through transient loads, or the engine electronic control (EEC) needs to manage the loads before they occur and accommodate them accordingly. Thus a conventional approach is to indicate an impending load change via a discrete input from the aircraft to the EEC. However this may not resolve the problem, particularly if the electrical transient load is more rapid with respect to time than the capability of the engine to respond.

SUMMARY

More particularly, the present inventor has identified two problems with the conventional approach:

(1) There is no control of the rate of change of a transient load, and therefore the engine control needs to overcompensate so as to maintain an appropriate surge margin because the response time of the engine will almost certainly be much slower than the response time of the generator to the transient load; and (2) The different manner in which an engine should pre-handle a small load as opposed to a large load are difficult to accommodate, as they would have to be pre-mapped into the engine control.

An aim of the invention is to provide a method of operating an engine and an electricity generator powered by the engine wherein the output of the generator is increased at a rate sustainable by the engine.

Accordingly, in a first aspect, the invention provides a method of operating an engine and an electricity generator powered by torque from the engine, the engine having a working line which is a locus of operating points of the engine as the engine is throttled, wherein the method includes:

increasing an electrical load on the generator; and
repeatedly performing the steps of:
(i) detecting the working line position of the engine;
(ii) determining if the detected working line position is sufficient or insufficient to allow the engine to provide additional torque to power the generator while maintaining engine operation within a predetermined range of acceptable engine operating conditions relative to the detected working line position;
(iii) when the determination at sub-step (ii) is that the engine operating condition is insufficient, modifying operational parameters of the engine to adjust the position of the working line to allow the engine to provide the additional torque while maintaining engine operation within the predetermined range of acceptable engine operating conditions; and
(iv) increasing the electrical output from the generator by an amount such that the engine provides the additional torque;

until the electrical output of the generator matches the electrical load.

Advantageously, the method allows the required electrical load to be supplied by the generator at a rate which does not risk the engine operating in unacceptable engine operating conditions. In particular, as steps (i) to (iv) are repeated plural times, the additional torque at each repetition of step (ii) and the corresponding increase in generator electrical output at each repetition of step (iv) are incremental responses to the increased electrical load. By accumulating these incremental responses at each repetition, the engine can be maintained at an acceptable engine operating condition, while nonetheless transitioning to an operating condition which is able to satisfy the increased load.

In a second aspect, the invention provides an engine controller, operably connectable to an engine and an electricity generator powered by torque from the engine, the engine having a working line which is a locus of operating points of the engine as the engine is throttled, wherein the controller is configured such that in response to an increase in an electrical load on the generator the controller repeatedly performs the steps of:

(i) detecting the working line position of the engine;
(ii) determining if the detected working line is sufficient or insufficient to allow the engine to provide additional torque to power the generator while maintaining engine operation within a predetermined range of acceptable engine operating conditions relative to the detected working line position;
(iii) when the determination at step (ii) is that the engine condition is insufficient, modifying operational parameters of the engine to adjust the position of the working line to allow the engine to provide additional torque while maintaining engine operation within the predetermined range of acceptable engine operating conditions; and
(iv) increasing the electrical output from the generator by an amount such that the engine provides the additional torque;

until the electrical output of the generator matches the electrical load.

In the first or second aspect, the increasing electrical load may be in respect of a non-critical load, and the electrical output of the generator may be provided from one or more windings of the generator which are connected to the non-critical load. For example, the generator may have plural windings, some of which provide electrical output to one or more aircraft critical load(s) (e.g. avionics, electrically operated fuel pumps etc.), and some of which provide electrical output to aircraft non-critical load(s) (e.g. environmental cabin systems, anti-ice mats etc.). The method of the first aspect or the controller of the second aspect may be applied, in particular, just to windings of the generator which provide electrical output for the non-critical loads.

A third aspect of the invention provides an arrangement of an engine, an electricity generator powered by torque from the engine, and the electronic engine controller according to the second aspect, the engine having a working line which is a locus of operating points of the engine as the engine is throttled, and the engine and generator being controlled by the electronic engine controller in response to an increase in an electrical load on the generator.

A fourth aspect of the invention provides a computer program comprising code which, when run on a computer, causes the computer to perform a method of operating an engine, and an electricity generator powered by torque from the engine, the engine having a working line which is a locus of operating points of the engine as the engine is throttled, wherein, in response to an increase in an electrical load on the generator, the method includes:
repeatedly performing the steps of:
  (i) detecting the working line position of the engine;
  (ii) determining if the detected working line is sufficient or insufficient to allow the engine to provide additional torque to power the generator while maintaining engine operation within a predetermined range of acceptable engine operating conditions relative to the detected working line position;
  (iii) when the determination at step (ii) is that the engine condition is insufficient, modifying operational parameters of the engine to adjust the position of the working line to allow the engine to provide additional torque while maintaining engine operation within the predetermined range of acceptable engine operating conditions; and
  (iv) increasing the electrical output from the generator by an amount such that the engine provides the additional torque;
until the electrical output of the generator matches the electrical load.

A fifth aspect of the invention provides a computer readable medium storing the computer program of the fourth aspect.

Optional features of the invention will now be set out. These are applicable singly or in any combination with any aspect of the invention.

In step (iv) a pulse width modulator (PWM) may determine the electrical output from the generator by modifying a mark-to-space ratio of a control signal of the PWM.

Advantageously, this can improve the control and accuracy with which the electrical output is increased.

The generator may be a switched reluctance generator. Conveniently, this can allow the flux of the generator to be coupled and decoupled such that the increased electrical output from the generator precisely matches the additional torque.

However, as another option, the generator may be a permanent magnet generator, and a transient energy storage device may be used to store the output of the generator. In some examples, the transient energy storage device might be a capacitor or a bank of capacitors, similarly a battery which can discharge its energy at a sufficiently high rate may be suitable for use as the storage device. In this variant, the electrical output from the generator may not match the additional torque, but any excess energy output can be stored in the capacitor to be fed back into the generator and thence to the engine so that the overall electrical output of the generator, including its capacitor, matches the additional torque.

The engine may be a gas-turbine engine, e.g. an aeroengine. A limiting operating condition of the predetermined range of acceptable engine operating conditions may define a minimum acceptable surge margin of the gas-turbine engine. The operational parameters may be modified by adjusting one or more variable stator vanes and/or one or more bleed valves, e.g. to increase the surge margin of the engine. The surge margin and the working line may both relate to a compressor of the gas-turbine engine.

In step (iv), the electrical output from the generator may be increased by an amount which is a function of the minimum acceptable surge margin. For example, the electrical output can be increased by an amount such that any corresponding departure of the engine operating condition from the detected working line position is less than the minimum acceptable surge margin.

The generator may receive the torque from an interconnecting shaft of the gas-turbine engine, i.e. a shaft connecting a turbine to a compressor or fan of the engine. The interconnecting shaft may connect to an accessory gearbox of the engine, for example via a radial drive shaft, with the generator then being driven in turn by the accessory gearbox.

Rather than a gas-turbine engine, another option is for the engine to be an intermittent internal combustion engine, such as a diesel engine.

An electronic engine controller (EEC) may repeatedly perform the steps. For example, the EEC may increase the electrical output from the generator by controlling the above-mentioned PWM to modify the mark-to-space ratio. The EEC may reference one or more look-up tables to determine the range of acceptable engine operating conditions associated with a detected working line position.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 1:
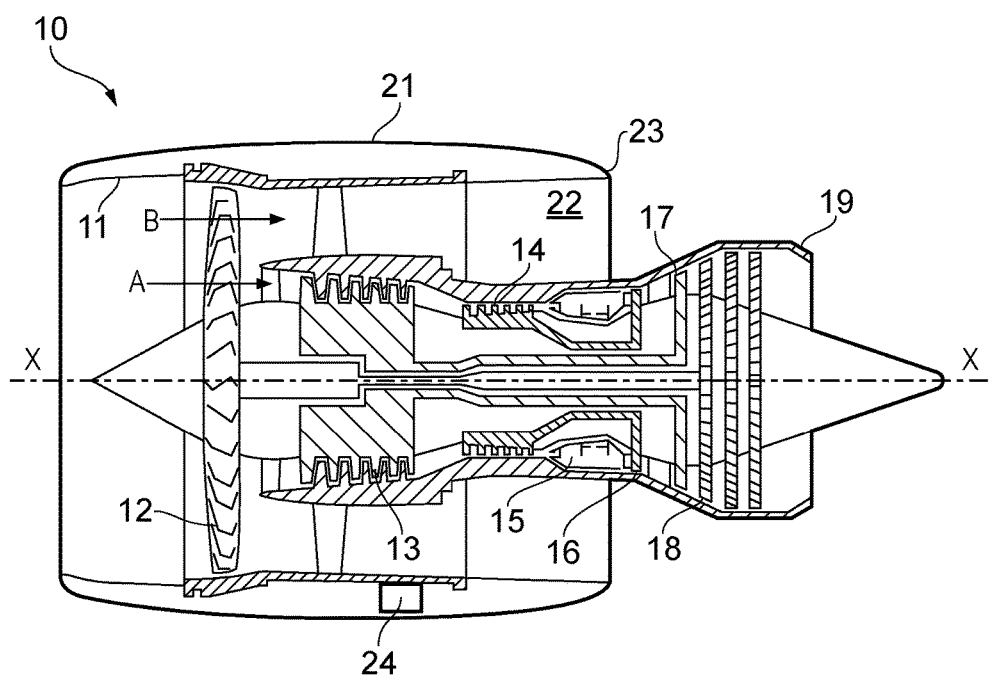
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The interconnecting shaft for the intermediate-pressure turbine 17 and compressor 13 is connected to an auxiliary gearbox 24 via a radial drive (not shown). The auxiliary gearbox in turn powers a starter/generator. Therefore as the gas-turbine engine operates it generates a torque which allows the starter/generator to produce electricity for powering aircraft systems. As discussed above, however, there is a risk that, by taking too much torque from the engine, the operating conditions of the intermediate-pressure compressor could deteriorate. For example the surge margin of the compressor could be reduced, resulting in distorted/unpredictable airflow through the compressor. This can lead to power fluctuations or engine stall, either of which is undesirable.

Figure 2:
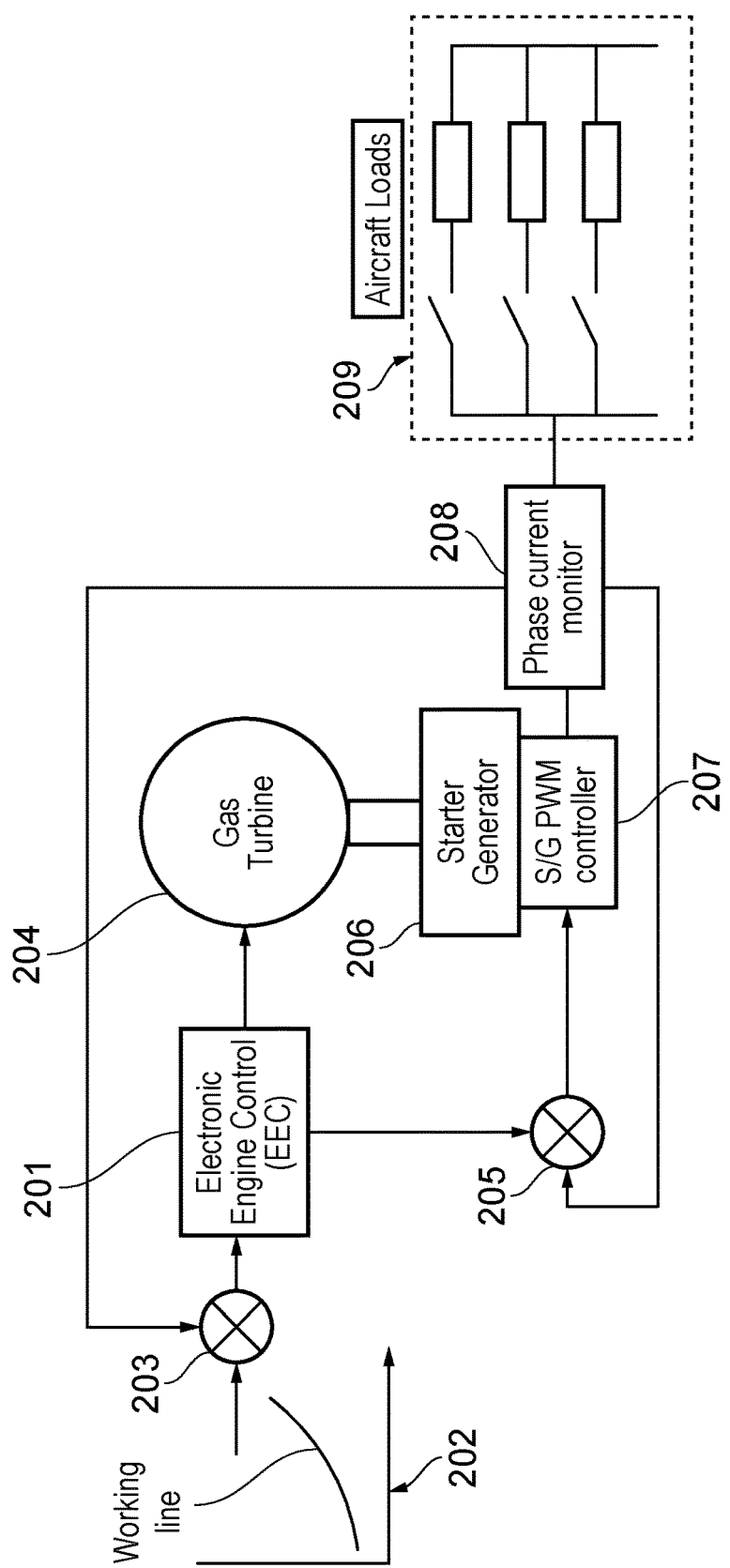
FIG. 2 shows a system schematic for managing an engine and generator.

FIG. 2 shows a system schematic for control of the engine and electrical generator. An electronic engine controller (EEC) 201, is operably connected to both the gas turbine engine 204 and the starter/generator 206. The EEC receives as an input 203 the engine's current position on a working line of a compressor map 202, as well as the current electrical output 208, e.g. phase current, of the generator. The electrical output of the generator is provided to aircraft electrical loads 209, such as electrical fuel pumps and cabin environmental controls.

The compressor map 202 is a predetermined operating map which is specific to the variant of gas-turbine engine in question, and is generally a plot of flow against pressure ratio for the intermediate-pressure compressor. The working line indicates a locus of operating points as the engine is throttled. Generally it is preferred that the engine be operated along the working line. The compressor map also indicates a minimum acceptable surge margin, a region of operating conditions of the compressor which is unsuitable for engine operation. The EEC operates to ensure that the engine operation takes place with a surge margin of at least a given size e.g. at an appropriate remove from the surge line.

Increasing the electrical output of the generator 206, without modifying the engine 204 operating parameters, could cause the engine's position on the compressor map 202 to encroach on the surge line, i.e. to operate with an inadequate surge margin. To avoid this, the EEC 201 outputs a control signal 205 to a pulse width modulator (PWM) 207 connected to the generator. The PWM in turn controls the output of the generator, and so ensures that the engine maintains an adequate surge margin. For example, if the generator is a switched reluctance generator, the PWM controls the coupling and de-coupling of the flux in the generator. The gain on the PWM control signal 205 from the EEC can be modified by reference to the current electrical output 208. The current electrical output can either be measured in each of the generated phases within the generator, or at the output of the generator i.e. in series with the electrical load.

Figure 3:
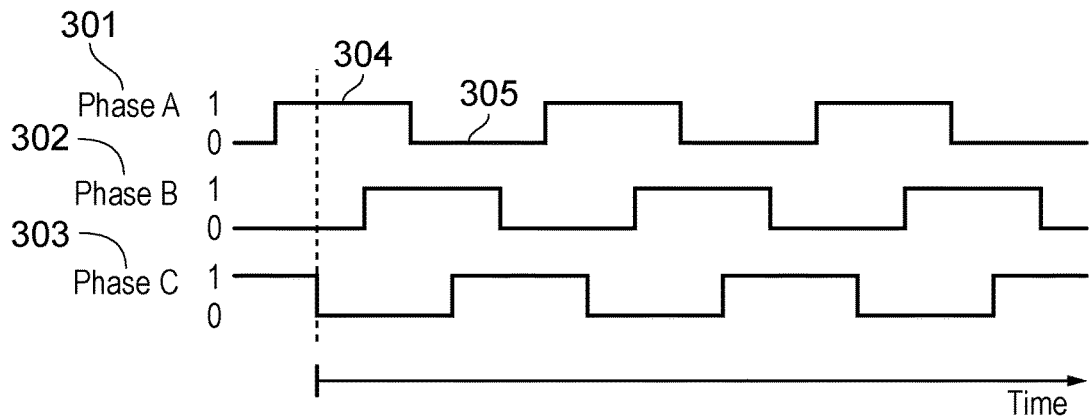
FIG. 3 shows gate drive signals provided by the PWM to the generator in FIG. 2.

FIG. 3 illustrates an example of gate drive signal(s) by which, in response to the PWM control signal 205 from the EEC 201, the PWM controls the generator. More particularly, the generator 206 produces a three-phase electrical output with phases A, B, and C, and therefore three gate drive signals 301-303 are provided by the PWM—one for each phase. Each signal has two components: a mark 304 where the signal is high and the generator provides electrical output, and a space 305 where the signal is low and the generator does not provide electrical output. By modifying the time during which the signal is high relative to the time during which the signal is low (i.e. the mark-to-space ratio) the total electrical output of the generator can be modified. The signals may start at a mark-to-space ratio on the order of 10% of a final mark-to-space ratio, i.e. 10% of the mark-to-space ratio which ultimately meets the electrical demand. Another option is for the signal(s) to start at a mark-to-space ratio determined by the current position of the engine on the working line.

Figure 4:
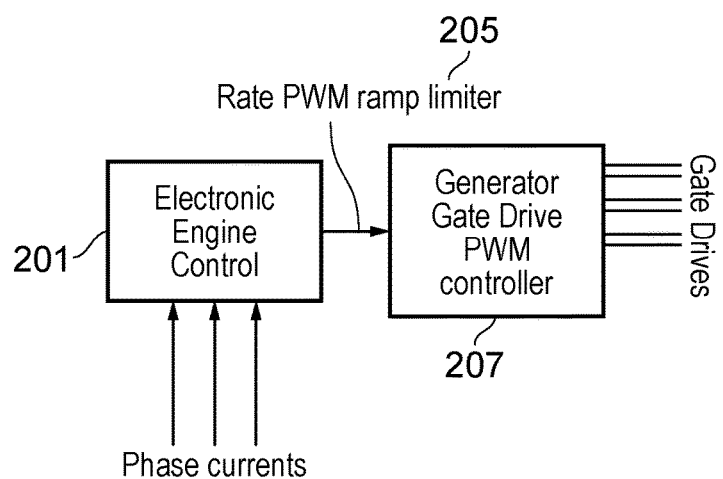
FIG. 4 shows schematically the relation between an EEC and a PWM of the system of FIG. 2.

As shown schematically in FIG. 4, the PWM control signal 205 from the EEC 201 is effectively a ramp limiter on the PWM which ensures that the PWM does not increase the mark-to-space ratio at a rate that could cause the engine to have too small a surge margin.

Figure 5:
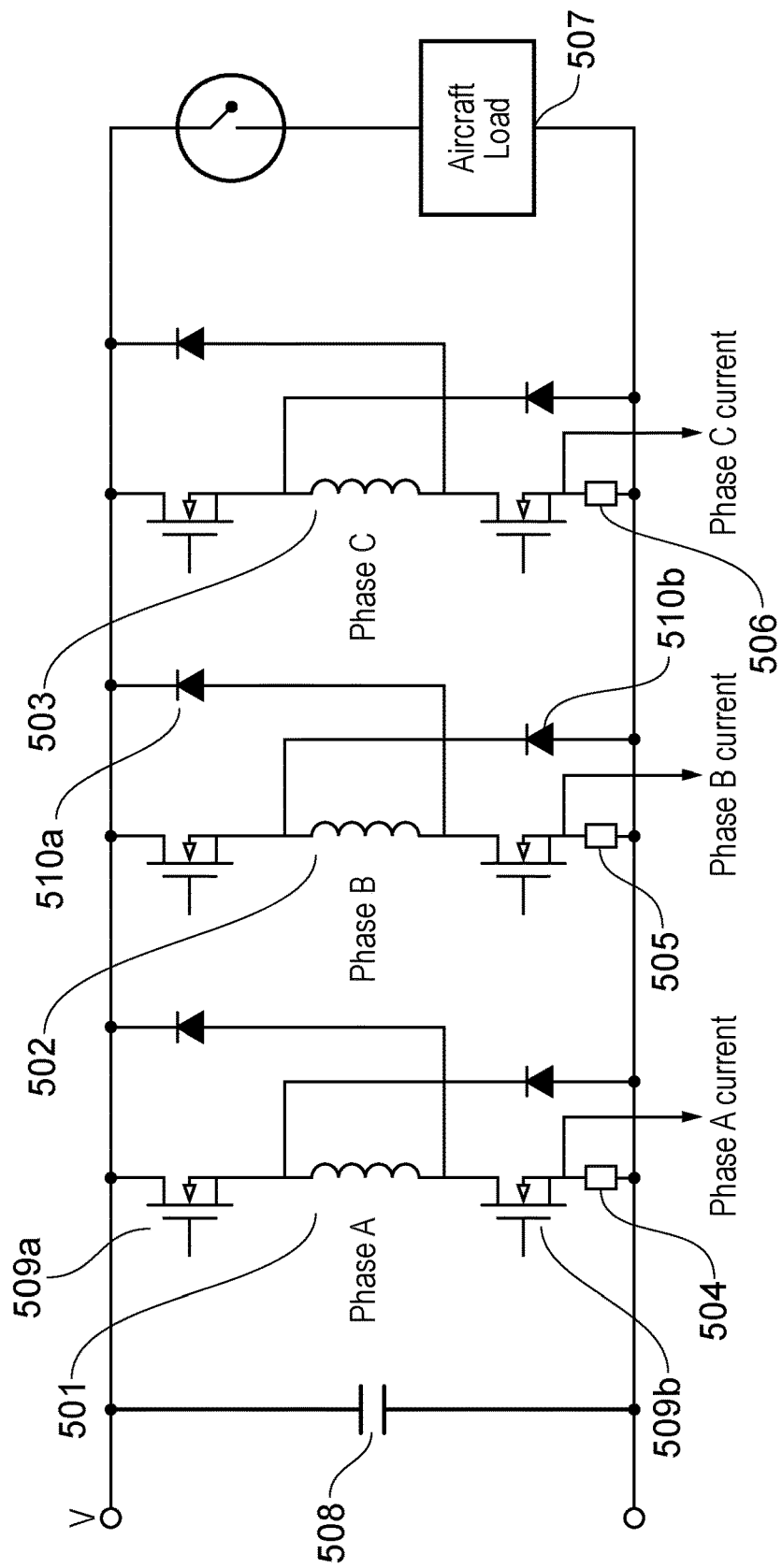
FIG. 5 shows an electrical circuit diagram for controlling the output from the generator.

FIG. 5 is circuit diagram showing how the three phase electrical output is generated by respective inductors: phase A inductor 501, phase B inductor 502, phase C inductor 503. The currents generated by these inductors are measured by respective ammeters 504, 505, 506, before being applied to the aircraft load 507. A capacitor 508 is included to smooth the current generated by the inductors. Each inductor is situated between a pair of gates 509a, 509b which are driven by the PWM. When a high signal is provided by the PWM, the gates allow the flow of current through the respective ammeter and to the aircraft load. When a low signal is provided by the PWM, the gates do not allow current to flow through them. Respective diodes 510a and 510b are provided providing a return path from the aircraft load through the respective inductors. This allows for power to be provided from the aircraft load to the generator, such that torque is provideable to the engine. For example during engine start-up, a source of power could be provided such that the generator operates as a starter motor.

Figure 6:
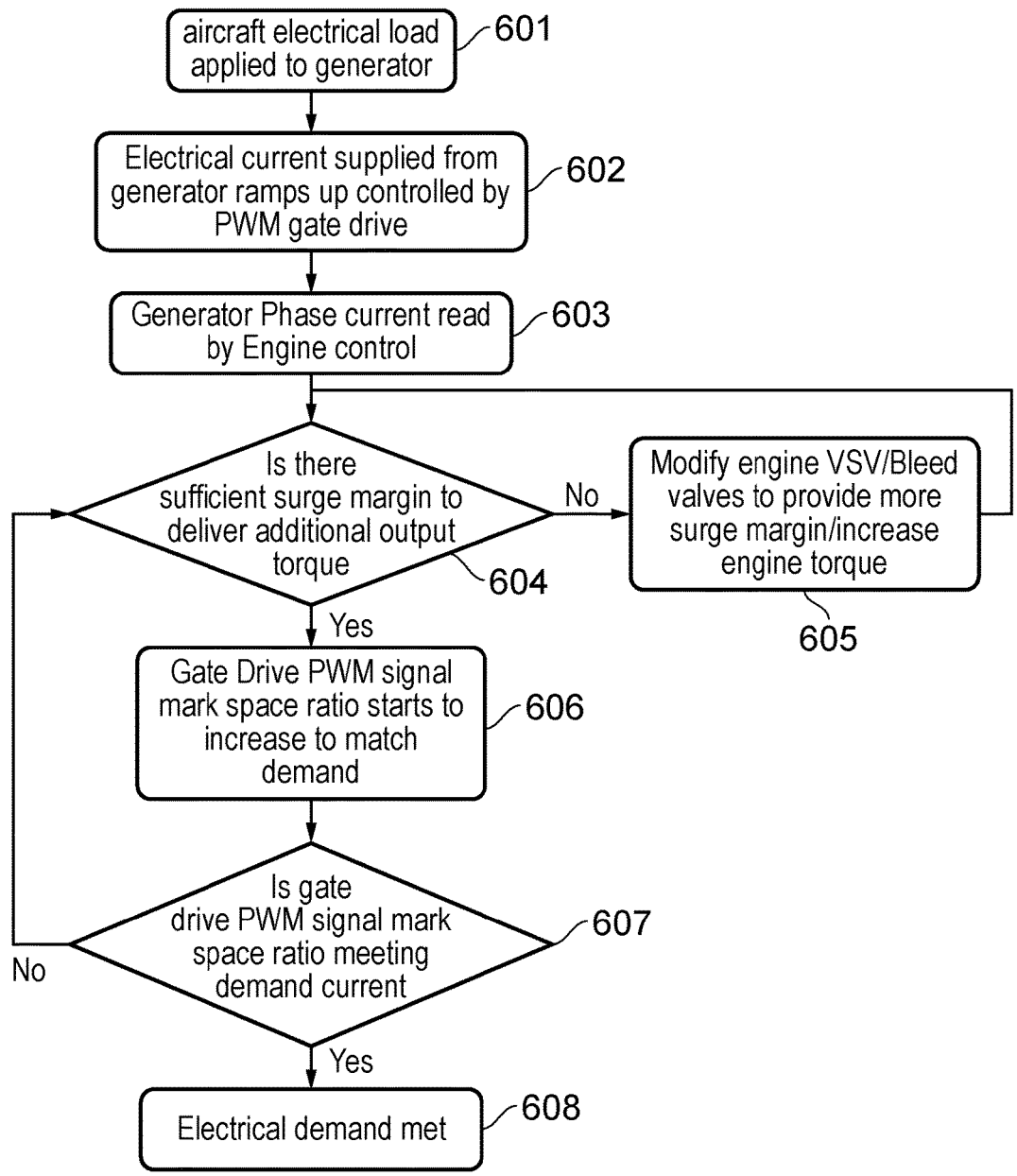
FIG. 6 shows a flow-diagram illustrating the control of the generator and engine.

FIG. 6 shows a flow diagram describing the control of the engine and generator. In a first step 601, an electrical load is applied to the generator. This step can be under the control of the EEC, or may be performed by a system external thereto. The increase in the electrical load stimulates a second step 602, in which the electrical current supplied by the generator is increased at a rate controlled by the PWM (the PWM being controlled in turn by the EEC) as discussed below. The ramp rate is selected such that the electrical output from the generator is initially lower than required by the load in order to avoid any risk that the engine may be pushed into an unacceptable operating condition. After step 602, the EEC, in step 603, reads the generator phase current which is being provided. At this stage, the EEC enters a repeat loop in which it initially determines (step 604) whether there is sufficient surge margin to deliver an additional increment in output torque, e.g. can the engine provide additional electrical output without encroaching on the surge line. More particularly, the determination of the surge margin involves detecting the working line position of the engine, and then determining if the detected position is sufficient or insufficient to allow the engine to provide the additional torque needed to provide the additional electrical output while maintaining an adequate surge margin. If not, in step 605 the EEC orders the modification of certain engine operation parameters. For example, the EEC may modify one or more variable stator vanes and/or bleed valves to thereby provide a larger surge margin and/or increase the available engine torque. These modifications move the working line of the engine relative to the surge line to increase the surge margin.

If there is a sufficient surge margin to deliver the additional torque to the generator, then in step 606 the gate drive PWM signal mark-to-space ratio begins to increase to match the increased electrical demand. The EEC then determines in step 607 whether the current gate drive PWM signal is causing the output of the generator to meet the increased electrical demand. If so, the demand is met as shown in step 608 and the loop stops. If not, the loop returns to step 604 to so as to determine if the surge margin can facilitate a further increase in electrical output.

As a result of this method, the size of the load being applied does not need to be known in advance. The control of the engine and generator is dynamic, i.e. when an electrical load is applied the PWM control of the generator ramps up and the current delivered to the electrical load is monitored and fed into engine control laws in the EEC. This is achieved by 'closing the loop' between the control of the PWM and the detected working line position.

Figure 7:
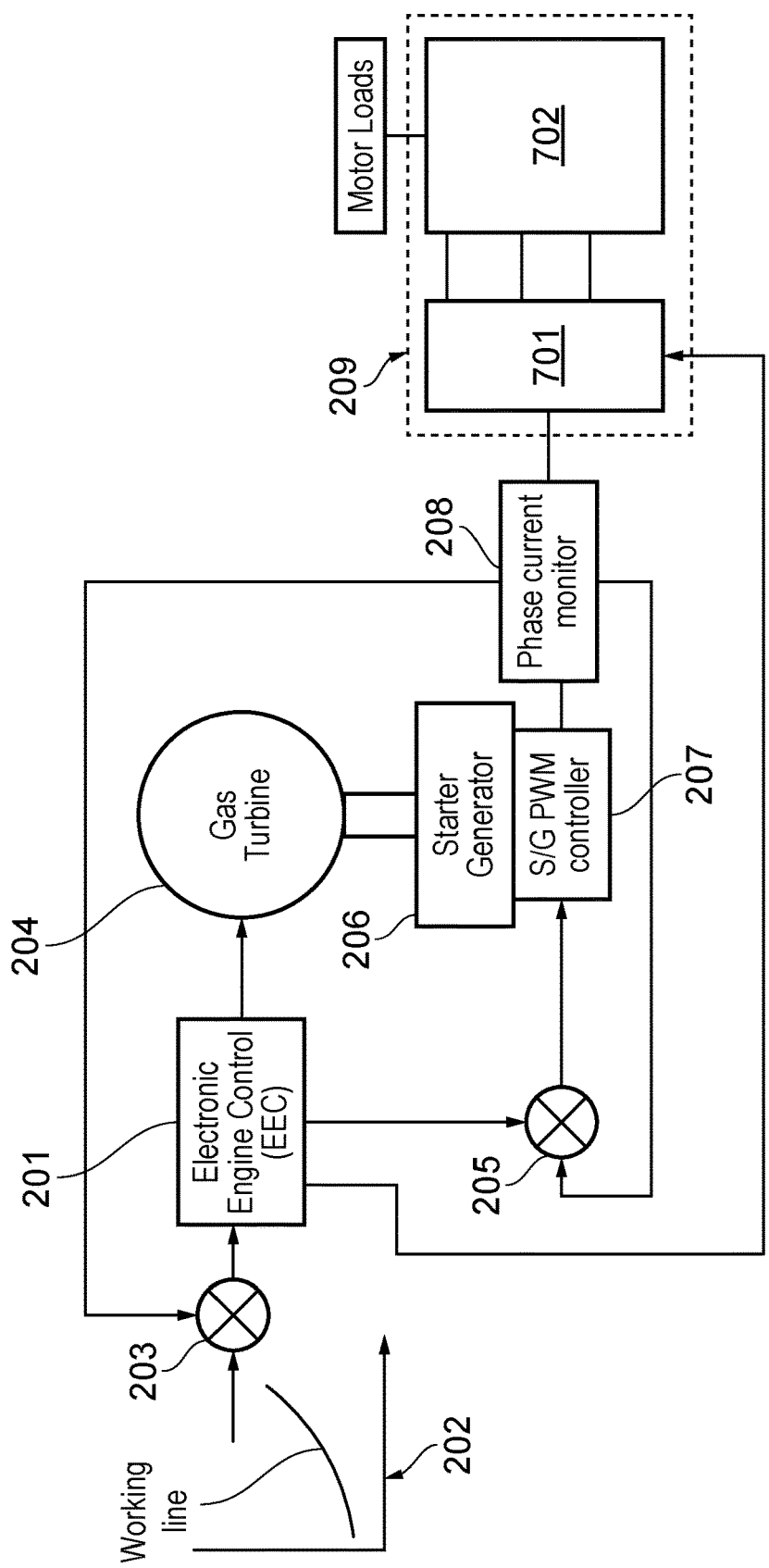
FIG. 7 shows another system schematic for managing an engine and generator.

FIG. 7 shows a more specific version of the system of FIG. 2. In the more specific system, the electrical output 208 of the generator 206 is provided to an aircraft load 209 comprising a motor controller 701 (such as a multi-phase PWM inverter) and an electric motor 702 controlled and powered by the motor controller (e.g. under the guidance of the EEC 201). This motor then has further loads, an example of which can be one or more propulsive fans of the aircraft. The system is this suitable for controlling an all-electric aircraft propulsion system, such as the E-Thrust™ concept developed by Airbus SE and Rolls-Royce plc. That is, the system manages the power drawn from the generator by the electric motor 702 until the gas turbine 204 is providing sufficient output torque to deliver the required electric power.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A method of operating a gas-turbine engine and an electricity generator powered by torque from the engine, the engine having a working line which is a locus of operating points of a compressor of the engine as the engine is throttled, the method comprising:
   increasing an electrical load on the generator; and
   repeatedly performing the steps of:
   (i) detecting a working line position of the engine;
   (ii) determining if the detected working line position is sufficient or insufficient to allow the engine to provide additional torque to power the generator while maintaining engine operation within a predetermined range of acceptable engine operating conditions relative to the detected working line position;
   (iii) when the determination at step (ii) is that the detected working line position is insufficient, modifying operational parameters of the engine to adjust a position of the working line to allow the engine to provide the additional torque while maintaining engine operation within the predetermined range of acceptable engine operating conditions; and
   (iv) increasing an electrical output from the generator by an amount such that the engine provides the additional torque,
   wherein the steps (i)-(iv) are repeated until the electrical output of the generator matches the increased electrical load.

2. The method of claim 1, wherein in step (iv) a pulse width modulator controls the electrical output from the generator by modifying a mark-to-space ratio of a control signal of the pulse width modulator.

3. The method of claim 1, wherein the generator is a switched reluctance generator.

4. The method of claim 1, wherein the predetermined range of acceptable engine operating conditions include a condition of a minimum acceptable surge margin of the gas-turbine engine.

5. The method of claim 4, wherein in step (iv) the electrical output from the generator is increased by an amount which is determined by a function of the minimum acceptable surge margin.

6. The method of claim 1, wherein the operational parameters which are modified are adjustment settings of one or more variable stator vanes and/or one or more bleed valves.

7. The method of claim 1, wherein the generator receives the torque from an interconnecting shaft of the gas-turbine engine.

8. The method of claim 1, wherein the steps (i)-(iv) are repeatedly performed by an electronic engine controller.

9. An electronic engine controller, operably connectable to a gas-turbine engine and an electricity generator powered by torque from the engine, the engine having a working line which is a locus of operating points of a compressor of the engine as the engine is throttled, wherein the controller is configured such that, in response to an increase in an electrical load on the generator, the controller repeatedly performs the steps of:
   (i) detecting a working line position of the engine;
   (ii) determining if the detected working line position is sufficient or insufficient to allow the engine to provide additional torque to power the generator while maintaining engine operation within a predetermined range of acceptable engine operating conditions relative to the detected working line position;
   (iii) when the determination at step (ii) is that the detected working line position is insufficient, modifying operational parameters of the engine to adjust a position of the working line to allow the engine to provide additional torque while maintaining engine operation within the predetermined range of acceptable engine operating conditions; and
   (iv) increasing an electrical output from the generator by an amount such that the engine provides the additional torque,
   wherein the steps (i)-(iv) are repeated until the electrical output of the generator matches the increased electrical load.

10. An arrangement of the gas turbine engine, the electricity generator powered by the torque from the engine, and the electronic engine controller according to claim 9, the engine having the working line which is the locus of operating points of the compressor of the engine as the engine is throttled, and the engine and the generator being controlled by the electronic engine controller in response to an increase in the electrical load on the generator.

11. A non-transitory computer readable medium storing a computer program comprising code which, when run on a computer, causes the computer to perform a method of operating a gas turbine engine and an electricity generator powered by torque from the engine, the engine having a working line which is a locus of operating points of a compressor of the engine as the engine is throttled, wherein, in response to an increase in an electrical load on the generator, the computer performs the method which comprises:

repeatedly performing the steps of:
(i) detecting a working line position of the engine;
(ii) determining if the detected working line position is sufficient or insufficient to allow the engine to provide additional torque to power the generator while maintaining engine operation within a predetermined range of acceptable engine operating conditions relative to the detected working line position;
(iii) when the determination at step (ii) is that the detected working line position is insufficient, modifying operational parameters of the engine to adjust a position of the working line to allow the engine to provide additional torque while maintaining engine operation within the predetermined range of acceptable engine operating conditions; and
(iv) increasing an electrical output from the generator by an amount such that the engine provides the additional torque,
wherein the steps (i)-(iv) are repeated until the electrical output of the generator matches the increased electrical load.

* * * * *